United States Patent
Seibert et al.

(10) Patent No.: US 7,882,024 B2
(45) Date of Patent: Feb. 1, 2011

(54) SYSTEM AND METHOD FOR EFFICIENTLY PROCESSING MULTIPLE CREDIT APPLICATIONS

(75) Inventors: Richard Seibert, Escondido, CA (US); Brad Rogers, Commerce, MI (US); Mark David Christensen, Troy, MI (US); Michael Jurecki, Grosse Isle, MI (US)

(73) Assignee: Routeone LLC, Southfield, MI (US)

( * ) Notice: Subject to any disclaimer, the term of this patent is extended or adjusted under 35 U.S.C. 154(b) by 1033 days.

(21) Appl. No.: 10/948,068

(22) Filed: Sep. 23, 2004

(65) Prior Publication Data

US 2005/0108129 A1    May 19, 2005

Related U.S. Application Data

(60) Provisional application No. 60/505,800, filed on Sep. 24, 2003.

(51) Int. Cl.
    *G06Q 40/00* (2006.01)
(52) U.S. Cl. .............. 705/38; 705/35; 705/67; 709/201; 709/226; 715/744; 715/780
(58) Field of Classification Search .......... 705/38, 705/37, 7, 14.64; 715/234; 709/229
    See application file for complete search history.

(56) References Cited

U.S. PATENT DOCUMENTS

| | | | | |
|---|---|---|---|---|
| 4,937,439 A | * | 6/1990 | Wanninger et al. | 235/456 |
| 5,611,052 A | * | 3/1997 | Dykstra et al. | 705/38 |
| 5,765,144 A | * | 6/1998 | Larche et al. | 705/38 |
| 5,966,699 A | * | 10/1999 | Zandi | 705/38 |
| 6,016,482 A | * | 1/2000 | Molinari et al. | 705/35 |
| 6,021,400 A | * | 2/2000 | Gallacher et al. | 705/43 |
| 6,029,146 A | | 2/2000 | Hawkins et al. | |
| 6,029,149 A | | 2/2000 | Dykstra et al. | |

(Continued)

FOREIGN PATENT DOCUMENTS

| | | |
|---|---|---|
| AU | 784943 | 6/2002 |
| AU | 9712601 A | 6/2002 |
| NZ | 506319 A | 12/2001 |

OTHER PUBLICATIONS

Bloombery Businessweek, Lending Tree: Steadily Spreading Its Roots, Dean Foust, Feb. 7, 2002 (LTree).*
Blanche Evans, Want Loans on Your Site? LoansDirect Wants to be Your Partner, Realty Times, Oct. 19, 1999 (Realty).*
Examination Report for European Application No. 04788962.1 dated Sep. 29, 2008.

(Continued)

*Primary Examiner*—Ella Colbert
*Assistant Examiner*—Chika Ojiaku
(74) *Attorney, Agent, or Firm*—Nixon Peabody LLP; David B. Ritchie

(57) ABSTRACT

A system and method for forwarding multiple credit applications to multiple potential lenders. A user computer or a credit management server sends queries to potential lenders inquiring about the respective information fields used in the potential lenders' respective credit applications. The queries also request information relating to the desired format and transmission method of the respective credit applications. With this information, a dynamic credit application is generated which includes all of information fields from all potential lenders. A credit applicant enters credit information into the dynamic credit application. The system then generates tailored credit applications for each lender and forwards these tailored applications to the respective potential lenders. The lenders process the tailored applications and provide results to the user.

15 Claims, 4 Drawing Sheets

U.S. PATENT DOCUMENTS

| | | | |
|---|---|---|---|
| 6,223,983 B1* | 5/2001 | Kjonaas et al. | 235/379 |
| 6,385,594 B1* | 5/2002 | Lebda et al. | 705/38 |
| 6,574,314 B1* | 6/2003 | Martino | 379/93.17 |
| 6,587,841 B1 | 7/2003 | DeFrancesco et al. | |
| 6,606,842 B2* | 8/2003 | Ohshita | 53/532 |
| 6,668,273 B1* | 12/2003 | Rust | 709/204 |
| 6,738,740 B1* | 5/2004 | Barash | 704/235 |
| 6,867,789 B1* | 3/2005 | Allen et al. | 715/744 |
| 7,010,616 B2* | 3/2006 | Carlson et al. | 709/246 |
| 7,089,503 B1* | 8/2006 | Bloomquist et al. | 715/780 |
| 7,136,814 B1* | 11/2006 | McConnell | 704/246 |
| 7,146,337 B1* | 12/2006 | Ward et al. | 705/38 |
| 7,181,427 B1* | 2/2007 | DeFrancesco et al. | 705/38 |
| 7,254,557 B1* | 8/2007 | Gillin et al. | 705/40 |
| 7,261,239 B2* | 8/2007 | Rao | 235/472.01 |
| 7,287,008 B1* | 10/2007 | Mahoney et al. | 705/38 |
| 7,366,694 B2* | 4/2008 | Lazerson | 705/38 |
| 7,478,064 B1* | 1/2009 | Nacht | 705/38 |
| 7,542,922 B2* | 6/2009 | Bennett et al. | 705/26 |
| 2001/0011246 A1 | 8/2001 | Tammaro | |
| 2001/0029482 A1* | 10/2001 | Tealdi et al. | 705/38 |
| 2002/0091630 A1 | 7/2002 | Inoue | |
| 2003/0041003 A1* | 2/2003 | Kayser, III | 705/37 |
| 2003/0135451 A1* | 7/2003 | O'Brien et al. | 705/38 |
| 2003/0172025 A1 | 9/2003 | Gallina | |
| 2004/0034684 A1* | 2/2004 | Payne | 709/201 |
| 2006/0277123 A1 | 12/2006 | Kennedy et al. | |
| 2008/0103963 A1* | 5/2008 | Mahoney et al. | 705/38 |

OTHER PUBLICATIONS

Written Opinion dated Mar. 20, 2006 in counterpart International Application No. PCT/US04/31281.
International Search Report dated Mar. 20, 2006 in counterpart International Application No. PCT/US04/31281.
Examiner's First Report for Australian Patent Application No. 2004277235 dated Dec. 2, 2009.
First Office Action for Chinese Patent Application No. 200480027706.1 dated May 8, 2009.
Second Office Action for Chinese Patent Application No. 200480027706.1 dated Oct. 30, 2009.
Rejection Decision for Chinese Patent Application No. 200480027706.1 dated Mar. 10, 2010.
Supplementary European Search Report for European Patent Application No. 04788962.1 dated Apr. 16, 2008.
Examination Report for New Zealand Patent Application No. 545754 dated Apr. 23, 2007.
Examination Report for New Zealand Patent Application No. 545754 dated Nov. 12, 2008.
Examination Report for New Zealand Patent Application No. 545754 dated Feb. 24, 2009.
Examination Report for New Zealand Patent Application No. 545754 dated Jun. 9, 2009.

* cited by examiner

SYSTEM AND METHOD FOR EFFICIENTLY PROCESSING MULTIPLE CREDIT APPLICATIONS

This application claims priority to application Ser. No. 60/505,800 filed Sep. 24, 2003 entitled "METHOD AND SYSTEM FOR MANAGEMENT OF MULTIPLE CREDIT APPLICATIONS", the entirety of which is hereby incorporated by reference.

BACKGROUND OF THE INVENTION

1. Field of the Invention

The invention relates to a credit application management system, and more particularly, to a system and method for efficiently processing multiple credit applications with multiple potential lenders.

2. Description of the Related Art

It is common for consumers to use credit and financing services to make major purchases of items such as automobiles, appliances, recreational vehicles and homes. In the past, vendors such as automobile dealers performed credit checks of potential customers manually before providing such financing services (either through the vendor itself or through a third party lender). The credit checks often involved filling out credit applications by hand and faxing or mailing the applications to creditors, credit bureaus or other potential lenders. Some credit bureaus were able to receive the credit application and offer a credit report over the telephone.

Such systems were generally slow and unreliable. Credit applications often require a great deal of information to be provided by the vender and/or credit applicant. Mistakes can easily be made in communicating this large volume of detailed information over the telephone, and handwritten information that has been faxed is often difficult to read. Physical mail services are also very slow.

With the advent of the Internet and similar computer communication networks, as well as the pervasiveness of personal computers, much of this process has been automated. Rather than completing credit applications by hand, vendors can now enter data into credit applications on their personal computers and transmit these credit applications electronically to banking and lending services through the Internet.

Referring to FIG. 1, there is shown a prior art credit application system 30, which utilizes a network 28, such as the Internet. A potential consumer or credit applicant 20 visits a vendor 22 seeking to make a major purchase such as an automobile. The purchase requires that a lender 34a, 34b, 34c provide financing for consumer 20. Vendor 22 receives credit information from consumer 20 and produces a credit application 26a that is in a format acceptable to, for example, lender 34a. Vendor 22 may use a computer 24 to send application 26a to lender 34a through network 28.

Computer 24 may access network 28 in a number of ways including modulating and demodulating data over a telephone line using audio frequencies, which may require a modem and connection to the Public Switched Telephone Network through an Internet service provider. Other ways to send data over a network include cable modems and digital subscriber lines.

A problem with system 30 is that different lenders 34a, 34b, 34c typically require different data in their credit applications, require the data to be provided in different formats, use different software interfaces and different transmission methods. If vendor 22 wishes to forward multiple credit applications to different lenders 34a, 34b, 34c, vendor 22 has to manually enter credit information about consumer 20 three times to generate three separate applications 26a, 26b, 26c for each lender 34a, 34b, 34c and may have to transmit each application 26a, 26b, 26c in a distinct manner. Like the manual methodologies of the past, this is still a slow process, and is prone to errors.

There is therefore a need in the art for a system and method which allows vendors and consumers to forward a credit application to multiple lenders in a more efficient and reliable way.

If the above problems could be overcome, credit application management could be used in many different environments. For example, sales persons in car dealerships could use it to query providers of car loans, real estate agents could use it to solicit banks regarding mortgages, and individuals could use it to solicit insurance quotes, apply for credit cards, and perform similar tasks.

SUMMARY OF THE INVENTION

One aspect of the invention is a method for forwarding multiple credit applications to multiple potential lenders. The method comprises sending a first query to a first potential lender, the first potential lender effective to process a first credit application with first information fields, the first query requesting a first response including the first information fields. The method further includes sending a second query to a second potential lender, the second potential lender effective to process a second credit application with second information fields, the second query requesting a second response including the second information fields. The method further includes generating a third credit application, the third credit application including all of the first and second information fields including at least one field included in the first information fields but not included in the second information fields.

Another aspect of the invention is a system for forwarding multiple credit applications to multiple potential lenders. The system comprises a user computer connected to and forming at least part of a network and a first lender computer connected to, and forming, at least part of the network. The system further comprises a second lender computer connected to and forming at least part of the network. In the system, the user computer sends a first query to the first lender computer, the first lender computer effective to process a first credit application with first information fields, the first query requesting a first response including the first information fields. The first lender computer sends the first response through the network to the user computer. The user computer sends a second query to the second lender computer, the second lender computer effective to process a second credit application with second information fields, the second query requesting a second response including the second information fields. The second lender computer sends the second response through the network to the user computer. The user computer generates a first credit application, the first credit application including all of the first and second information fields including at least one field included in the first information fields but not in the second information fields.

Yet another aspect of the invention is a computer readable storage medium including computer executable code for enabling a user to forward multiple credit applications to multiple potential lenders. The code performs the steps of sending a first query to a first potential lender, the first potential lender effective to process a first credit application with first information fields, the first query requesting a first response including the first information fields. The code further performs the step of sending a second query to a second potential lender, the second potential lender effective to process a second credit application with second information fields, the second query requesting a second response including the second information fields. The code further performs the step of generating a third credit application, the third credit application including all of the first and second information fields including at least one field included in the first information fields but not included in the second information fields.

Still yet another aspect of the invention is a credit application produced by the steps of sending a first query to a first potential lender, the first potential lender effective to process a first credit application with first information fields, the first query requesting a first response including the first information fields; sending a second query to a second potential lender, the second potential lender effective to process a second credit application with second information fields, the second query requesting a second response including the second information fields; and generating a third credit application, the third credit application including all of the first and second information fields including at least one field included in the first information fields but not included in the second information fields.

Another aspect of the invention is a method for forwarding multiple credit applications to multiple potential lenders. The method comprises receiving credit information from a credit applicant and entering the credit information into a first credit application. The method further comprises generating a second and third credit application based on the first credit application, the second and third credit applications being distinct. The method further includes forwarding the second credit application to a first potential lender and forwarding the third credit application to a second potential lender.

Still another aspect of the invention is a method for forwarding multiple credit applications to multiple potential lenders. The method comprises sending a first query to a first potential lender, the first potential lender effective to process a first credit application with first information fields, the first query requesting a first response including the first information fields. The method further comprises sending a second query to a second potential lender, the second potential lender effective to process a second credit application with second information fields, the second query requesting a second response including the second information fields. The method further comprises generating a third credit application based on the first and second information fields; receiving credit information from a credit applicant relating to the first credit application; and generating respective fourth and fifth credit applications for the first and second potential lenders respectively based on the credit information received for the first credit application, the fourth and fifth credit applications being distinct.

BRIEF DESCRIPTION OF THE DRAWINGS

These and other features of the invention will become more apparent from the following description in which reference is made to the appended drawings.

DETAILED DESCRIPTION OF THE PREFERRED EMBODIMENTS

Figure 1:
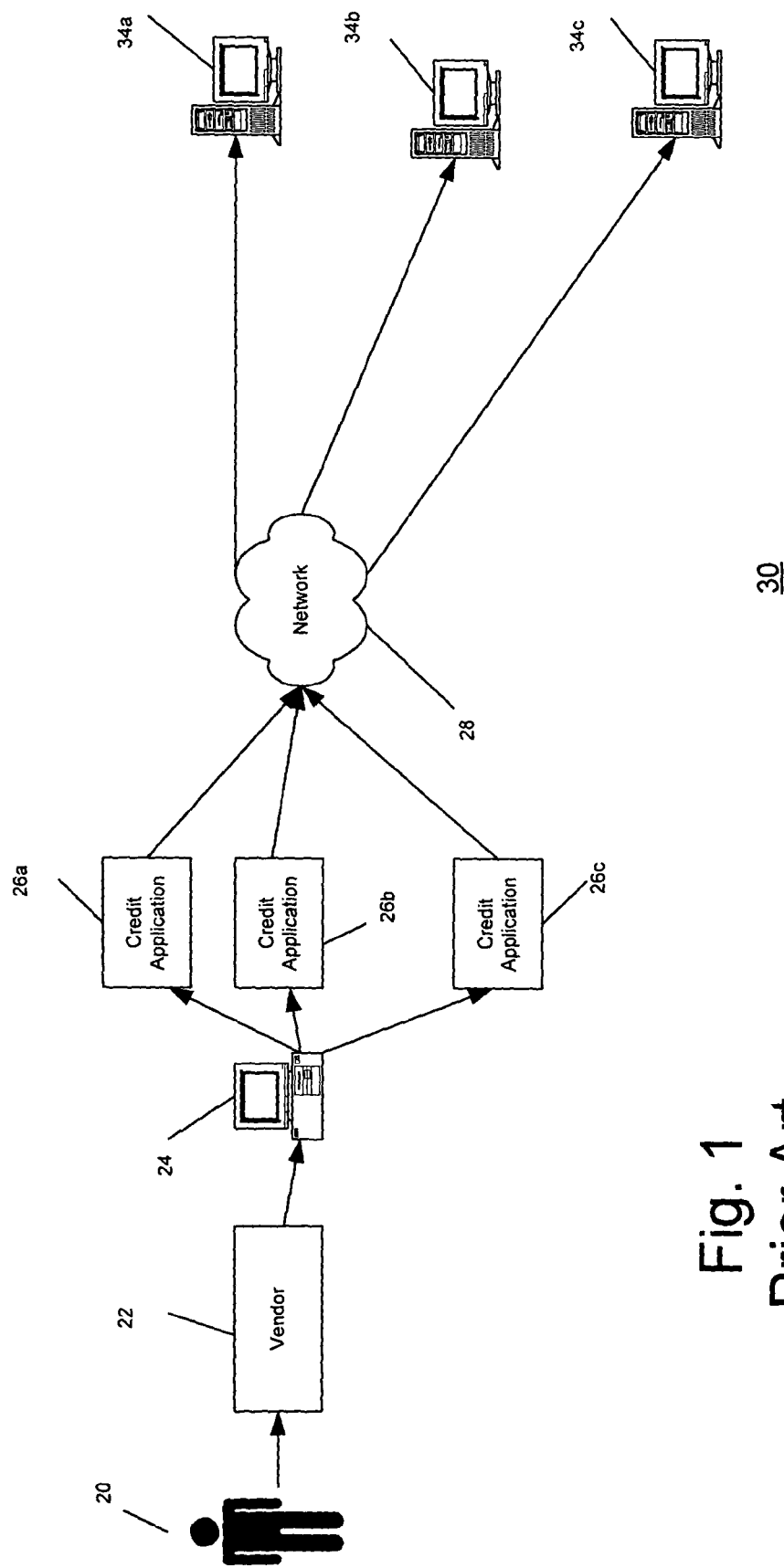
FIG. 1 is a network diagram of a prior art credit application system.
Figure 2:
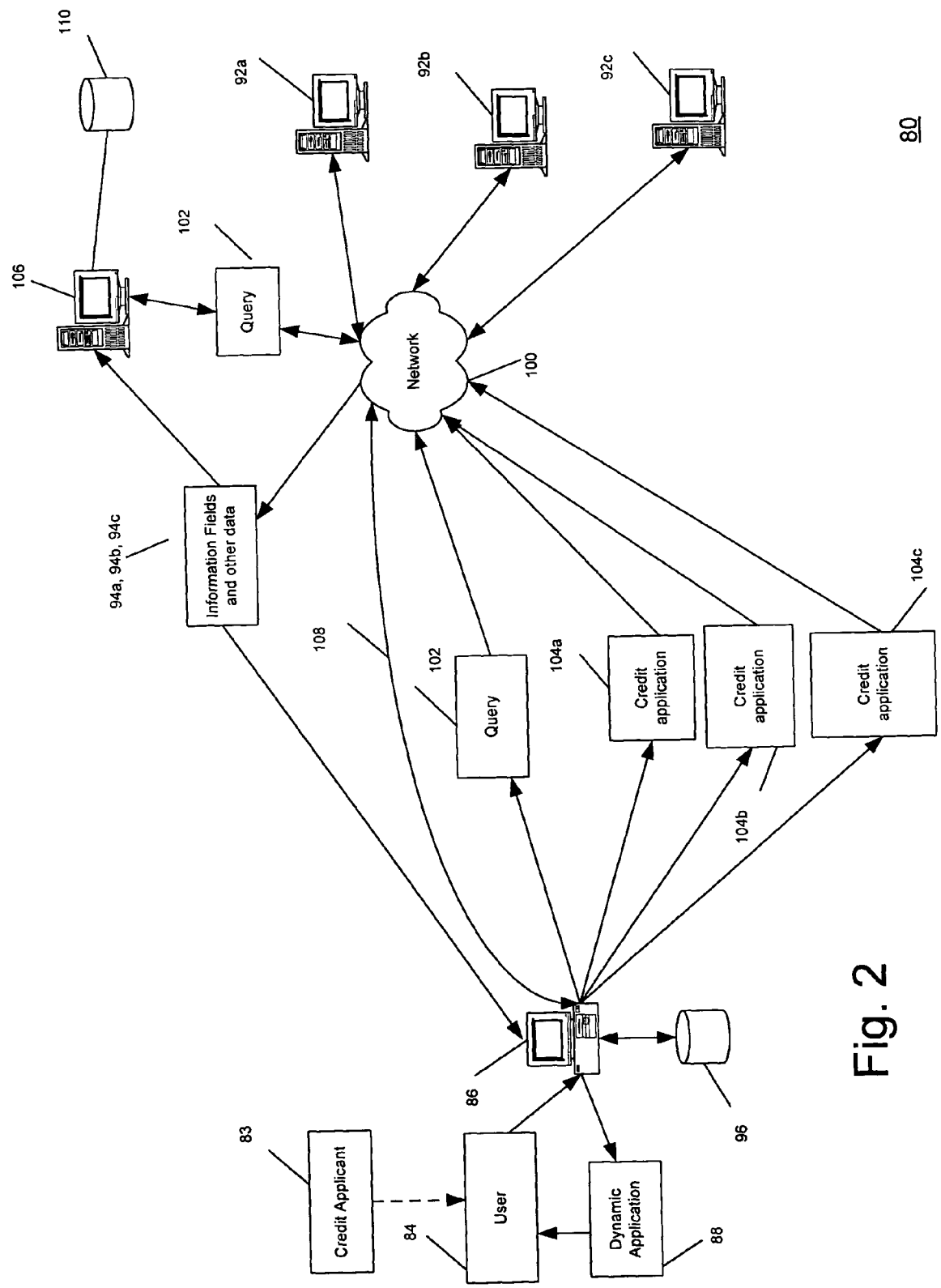
FIG. 2 is a network diagram illustrating a credit application system in accordance with the invention.

Referring to FIG. 2, there is shown a credit application system 80 in accordance with the invention. As shown in FIG. 2, a user 84 controls a computer 86 to send a query 102 to lenders 92a, 92b and 92c through a network 100 which could be, for example, the Internet. User 84 could be the credit applicant himself or a vendor in communication with the credit applicant. Query 102 asks for the types of information fields 94a, 94b, 94c each lender 92a, 92b, 92c would like to see in their respective credit applications. These information fields 94a, 94b, 94c along with other transmission information relating to communication with lenders 92a, 92b, 92c, such as the application format and the method of transmission are sent back to computer 86 and stored in a database 96. Alternatively, query 102 may originate from a credit management server 106 and then information fields and other transmission information 94a, 94b, 94c may be sent to credit management server 106 and stored in a database 110. User 84 operating computer 86 may communicate with credit management server 106 through the use of, for example, a browser so that information generated by credit management server 106 may be seen by user 84.

Using information fields 94a, 94b, and 94c, software on computer 86 or server 106 generates a dynamic credit application 88. Dynamic credit application 88 is dynamic in that it does not particularly match any single credit application form used by potential lenders 92a, 92b, 92c, but includes all information that all potential lenders 92a, 92b, 92c may require on their respective credit application forms.

Dynamic credit application 88 is displayed to and completed by user 84. If credit management server 106 is used, dynamic credit application 88 may be forwarded from credit management service 106 through network 100 and connection 108 to computer 86. The completion of dynamic credit application 88 may be effectuated by entering credit information data into electronic fields or in any manner known in the art. Some of these fields may have default values, while other fields may have menu options to assist in the accurate completion of the form. For example, a "State" or "Province" field may allow user 84 to select from one of the States or Provinces corresponding to the country which user 84 has identified.

Data in dynamic credit application 88 is then used by software on computer 86 or credit management server 106 to generate one or more credit applications 104a, 104b, 104c tailored to suit respective potential lenders 92a, 92b, 92c. Information fields and other transmission information 94a, 94b, 94c could, for example, be obtained using query 102 even before a potential consumer indicates a desire for a loan (such as by a vendor who periodically polls potential lenders) or obtained when consumer 83 indicates his desire for a financial service. Each lender 92a, 92b, 92c may have a different format, for its respective credit application, require different information and/or utilize a different software interface or a group of lenders may agree to use a common format.

Focusing on a single potential lender, lender 92a for example, credit application 104a, tailored specifically for lender 92a is sent to lender 92a through network 100. Lender 92a processes credit application 104a and provides a response to user 84. The response may take many forms, including, for example:

1. a request for further information;
2. a notice that information supplied appears to be in error;
3. an approval of the loan requested in the credit application;
4. an acknowledgement that the information is received, but a decision is pending;
or
5. a conditional acceptance.

Other responses are also possible. The invention is not limited by the nature of the response.

Network 100 may be one of many known in the art, and may comprise several different networks working together, including wireless networks such as cellular telephone networks, the public switched telephone network, cable television networks, the Internet, ATM networks, frame relay networks, local area networks (LANs) and wide area networks (WANs).

Computer 86 may be a smart terminal, personal digital assistant, Internet-ready telephone or other similar interface.

Credit application 104a, 104b, 104c will typically be text data but may also include: graphics, such as a photograph of the applicant's face, his driver's license, or other printed identification; audio files, such as a verbal password or voiceprint; data files, such as some manner of biometric identification including a retina scan or fingerprints; an electronic password such as a public key in a PKI (public key infrastructure) environment; or executable applets or other software files.

System 80 allows multiple credit applications to be forwarded to multiple potential lenders while only entering the credit applicant's data once. This methodology is much more effective than systems in the prior art. There is less likelihood of error, and much less time is required to file many credit applications. This translates into lower costs and less paperwork.

The invention provides the opportunity to produce comprehensive electronic reports and statistics. Such reports improve the reliability and efficiency of the system. Clearly, such reports were difficult and time consuming to produce and update using prior art manual systems. Because manual compilation was needed to gather the necessary data, with the invention, much or all of the information used to generate a report already resides in the system.

The invention provides improved precision and reliability and reduces time required to affect the credit application process. This time factor is important because studies have shown that the quicker the credit application process can be effected, the more likely that a consumer will make the purchase. This is a great benefit to, for example, a car dealer in terms of increased sales and improved customer satisfaction.

As noted above, user 84 may communicate with credit management server 106 using a Web Browser, such as NETSCAPE or INTERNET EXPLORER. A Web browser uses the hypertext transfer protocol ("HTTP") to make requests of Web servers throughout the Internet on behalf of the Web browser user. Currently, most Web browsers are implemented as graphical user interfaces. When user 84 enters file requests by either "opening" a Web file, typing in a Uniform Resource Locator (URL), or clicking on a hypertext link, the Web browser builds an HTTP request and sends it to the Internet Protocol address indicated by the URL. The HTTP software in the destination server machine receives the request and, after any necessary processing, the requested file is returned. The Hypertext Transfer Protocol (HTTP) is a set of rules for exchanging files on the World Wide Web, including text, graphic images, sound, video, and other multimedia files. HTTP also allows files to include references to other files whose selection will elicit additional transfer requests (hypertext links). Typically, the HTTP software on a Web server machine is designed to wait for HTTP requests and handle them when they arrive.

Figure 3:
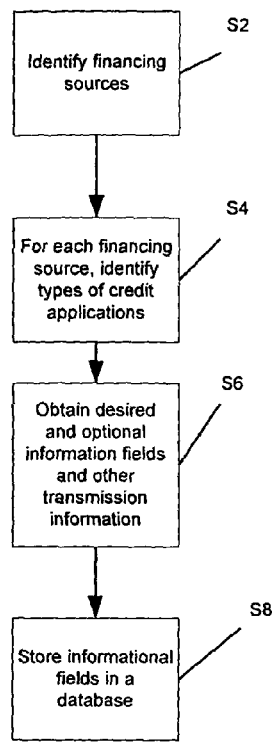
FIG. 3 is a flow chart illustrating a process for obtaining information fields from potential lenders in accordance with the invention.

A process for obtaining information fields from lenders in accordance with the invention will now be described with reference to FIG. 3. The process could, for example, be implemented using system 80 though any other system could be used. At step S2, a system in accordance with the invention identifies financing sources such as lenders. At step S4, for each financing source, the system identifies the types of credit applications available. Typical types of credit applications may include, for example, lease, finance and balloon arrangements (a balloon is a series of lease-like payments with a final payment that pays the residual value of a vehicle). At step S6, the system obtains desired and optional information fields, along with other transmission information relating to communication with potential lenders, such as the application format and the method of communication, for each of the types of credit applications determined at step S4. At step S8, the obtained information fields and other transmission information are stored in a database. In this way, the system has enough information to generate a dynamic credit application that includes all information that all potential lenders may require in their respective credit application forms. Steps S2, S4, S6 and S8 could be performed before a credit applicant indicates a desire for financing or after such an indication.

Figure 4:
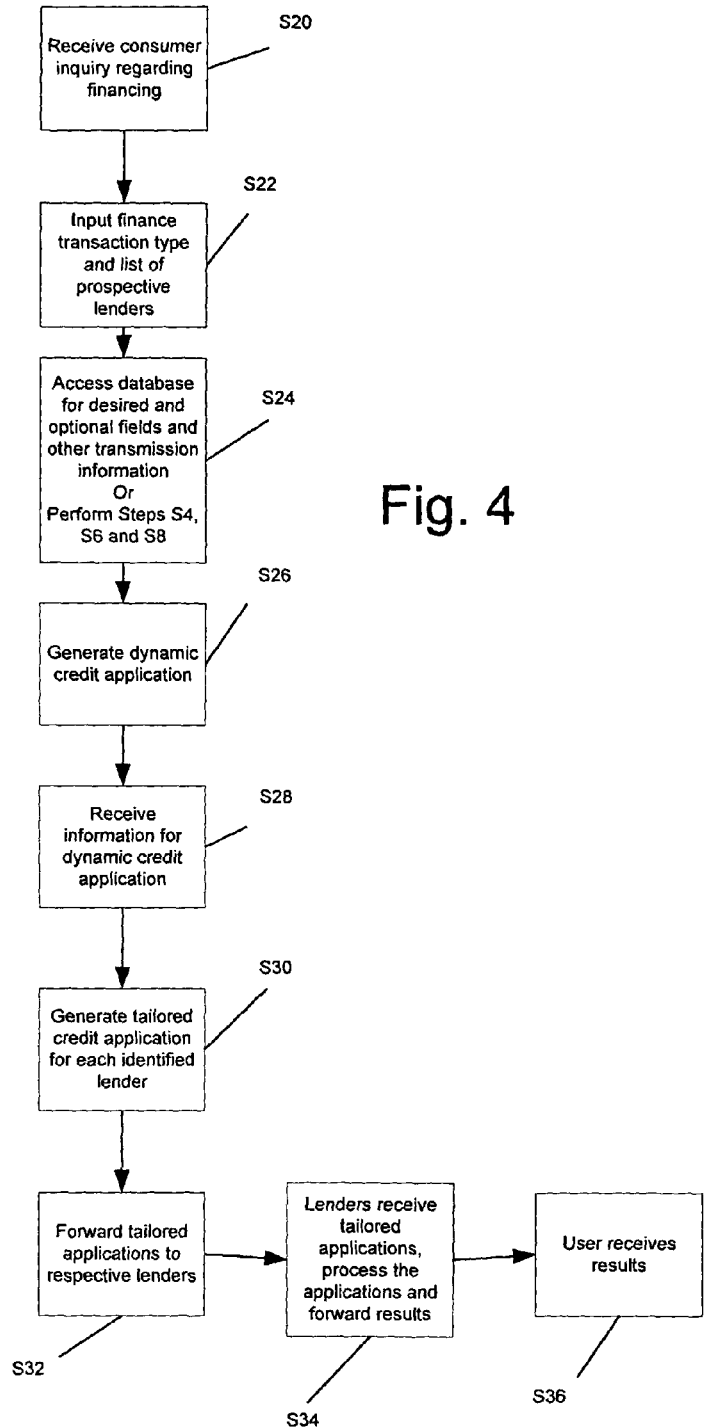
FIG. 4 is a flow chart illustrating a process for handling a credit application in accordance with the invention.

Referring now to FIG. 4, there is shown a method for processing a credit application in accordance with the invention. As with the process in FIG. 3, the process shown in FIG. 4 could be implemented using, for example, system 80. At step S20, a system in accordance with the invention receives an inquiry that a consumer or credit applicant desires financing. At step S22, a user (which could be, for example, the consumer, credit applicant or a vendor) inputs the financial transaction type (for example, lease, finance, balloon, etc.) desired by the consumer and a list of potential lenders. If the list of potential lenders is not known, the user may select from a list of vendors or select all available lenders. At step S24, the system accesses a database of information fields and determines the desired and optional fields for all credit applications for the input financial transaction type and list of potential lenders. Alternatively, the system may implement steps S4, S6 and S8 of FIG. 3 to determine the information fields. At step S26, the system creates a dynamic credit application which includes all fields used by all of the potential lenders for the input financial transaction type. The dynamic credit application may include desired and optional fields. The use of the dynamic credit application eliminates redundant fields occurring in multiple credit applications so that information is only requested and input once.

At step S28, the system receives credit information from a credit applicant (which could be the user of the system) to fill out the dynamic credit application. At step S30, the system generates a tailored credit application for each identified lender based on the input credit information. At step S32, the tailored applications are forwarded to respective lenders. Different lenders may require the application to be communicated in different formats and even using different communication protocols. Multiple lenders may agree to use the same format and then each individual lender may disregard multiple information not applicable to him. The tailored applications are generated and forwarded to the potential lenders in the format and the transmission method that the lenders desire. In general, all of the data may be manipulated in XML format. At step S34 the lenders receive the tailored applications, process the applications and forward the results. At step S36 the user of the system receives any results from the lenders.

As noted above, the responses from the prospective lenders may take many forms, including the following:

1. a request for further information;
2. a notice that information supplied appears to be in error;
3. an approval of the loan request;
4. an acknowledgement that the information is received, but a decision is pending; or
5. a conditional acceptance.

Of course, other responses are also possible and would be easily implemented by those skilled in the art.

The above methodology may be implemented using the following software components:

1. JAVA J2EE
2. IBM HTTP Apache Server V-JMS-MQSeries v5.2
3. IBM Websphere 5.x
4. SeeBeyond—Messaging and Integration Services
5. Sun ONE Identity Server
6. Sun ONE Directory Server
7. Oracle 9i
8. Reporting—Brio Portal and Reports Of course, other software components could also be used.

Figure 5:
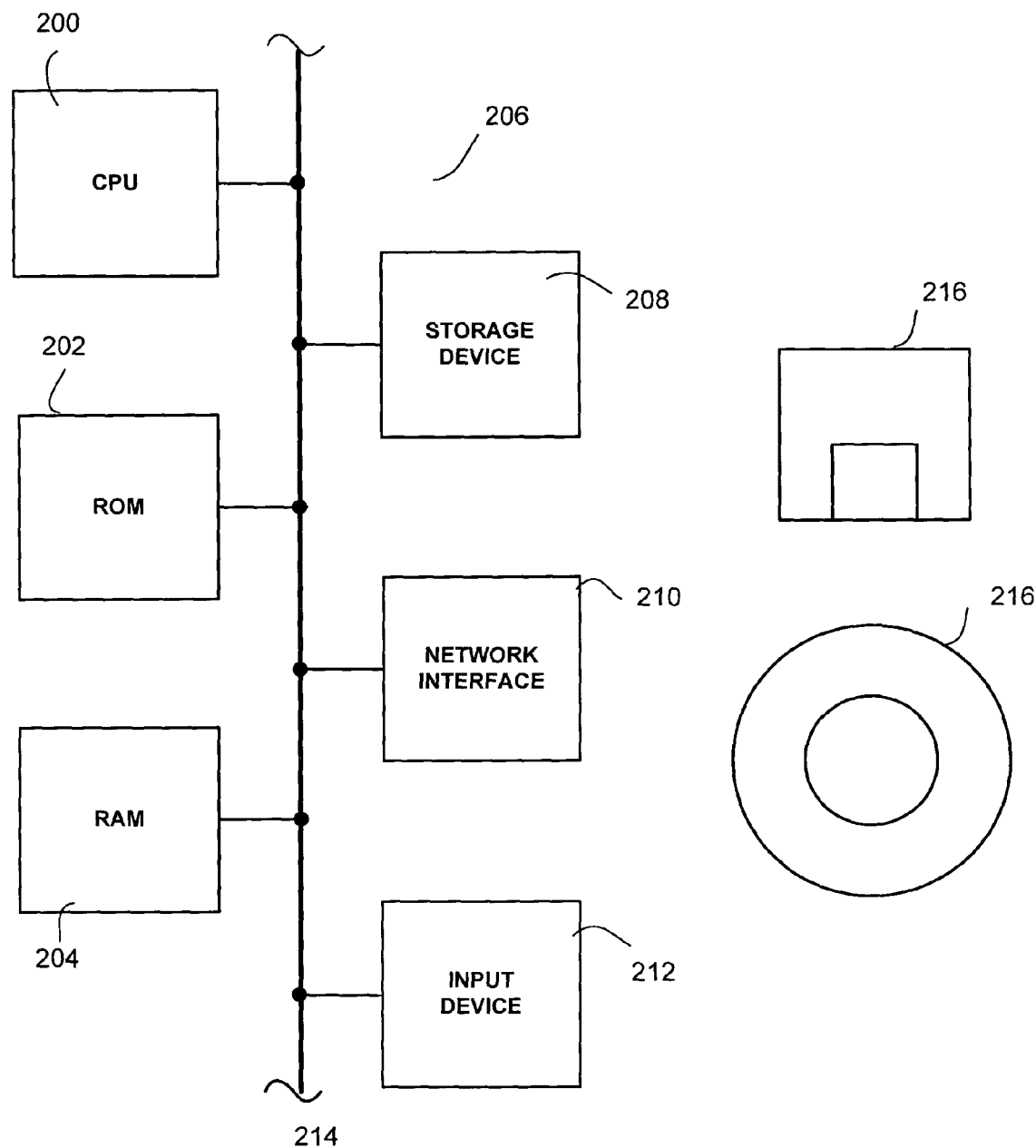
FIG. 5 is a diagram showing computer hardware which may be used in the invention.

Referring to FIG. 5 computer 86 and servers 92a, 92b, 92c, and 106 may each comprise a CPU 200, a read only memory ("ROM") 202, a random access memory ("RAM") 204, a storage device 208, a network interface (such as the ports discussed above) 210 and an input device 212 all coupled together by a bus 214. Software for implementing the invention may be stored at computer 86, credit management server 106 on a storage medium 216 or in any other known way.

Thus, by determining the types of information fields, format, and method of communication that prospective lenders may desire, creating a dynamic credit application based on the information fields, receiving and entering credit information into the dynamic credit application, and then forwarding a tailored credit application to potential lenders based on the dynamic credit application, a more efficient credit application system and method is realized which overcomes problems present in the prior art.

While particular embodiments of the present invention have been shown and described, it is clear that changes and modifications may be made to such embodiments without departing from the true scope and spirit of the invention. For example, any of the steps performed on user computer 86 could be performed on credit management server 106 and vice versa. Alternatively, all of the functionality of the credit management server 106 could be placed on one of the lender servers 92a, 92b, 92c.

The method steps of the invention may be embodied in sets of executable machine code stored in a variety of formats such as object code or source code. Clearly, the executable machine code may be integrated with the code of other programs, implemented as subroutines, by external program calls or by other techniques as known in the art.

The embodiments of the invention may be executed by a computer processor or similar device programmed in the manner described, or may be executed by an electronic system which is provided with means for executing these steps. Similarly, an electronic memory medium such computer diskettes, CD-ROMS, Random Access Memory (RAM), Read Only Memory (ROM) or similar computer software storage media known in the art, may be programmed to execute such method steps. Electronic signals representing these method steps may also be transmitted via a communication network.

The invention could, for example, be applied to computers, smart terminals, personal digital assistants and Internet-ready telephones. Again, such implementations would be clear to one skilled in the art, and do not take away from the invention.

What is claimed is:

1. A method comprising: receiving at a computer a consumer inquiry regarding financing including an input of the financial transaction type and a selection of potential lenders, the selection of potential lenders including a selection of a first potential lender and a selection of a second potential lender;

accessing with the computer a database that is configured to store at least first required information fields and optionally first optional information fields corresponding to the first potential lender and second required information fields and optionally second optional information fields corresponding to the second potential lender;

determining with the computer the first required information fields, first optional informational fields, second required information fields and second optional information fields for the input financial transaction type and the selection of potential lenders;

generating with the computer a dynamic credit application in response to the consumer inquiry, the dynamic credit application including at least the determined first and second required information fields;

receiving at the computer credit information from the consumer corresponding to the first and second required information fields generating a first credit application for the first potential lender based on the received credit information, the first credit application including at least the first required information fields; and generating a second credit application for the second potential lender based on the received credit information, the second credit application including at least the second required information fields.

2. The method as recited in claim 1, further comprising: transmitting the first credit application to the first potential lender; and transmitting the second credit application to the second potential lender.

3. The method as recited in claim 2, wherein:
the dynamic, first, and second credit applications are produced by a credit management server connected through a network to a user computer; and wherein the user computer is operated by a vendor.

4. The method as recited in claim 2, wherein:
the dynamic, first, and second credit applications are produced by a credit management server connected through a network to a user computer; and wherein the user computer is operated by the credit applicant.

5. The method as recited in claim 1, wherein the credit information is received at a user computer.

6. The method as recited in claim 5, wherein the user computer is operated by the credit applicant.

7. The method as recited in claim 5, wherein the user computer is operated by a vendor.

8. The method as recited in claim 5, wherein the vendor is a car dealer.

9. The method as recited in claim 1, further comprising storing the first and second information fields in the database.

10. The method as recited in claim 1, further comprising sending a first query to the first potential lender and a second query to the second potential lender, wherein the first and second queries include a request for the respective type of financial transactions and credit applications available from the first and second lenders to produce financial transaction and available credit application data; and the first and second information fields are based on the financial transaction and available credit application data.

11. The method as recited in claim 1, wherein the dynamic credit application is generated by a server; and the credit applicant views the dynamic credit application on a user computer connected to the server through a network.

12. A system comprising: memory; and a processor coupled to the memory, the processor configured to receive a consumer inquiry regarding financing including an input of the financial transaction type and a selection of potential lenders, the selection of potential lenders including a selection of a first potential lender and a selection of a second potential lender, access a database that is configured to store at least first required information fields and first optional information fields corresponding to the first potential lender and second required information fields and second optional information fields corresponding to the second potential lender, determine the first required information fields, first optional informational fields, second required information fields and second optional information fields for the input financial transaction type and the selection of potential lenders, generate a dynamic credit application in response to the consumer inquiry, the dynamic credit application including at least the determined first and second required information fields, receive credit information from the consumer corresponding to the first and second required information fields, generate a first credit application for the first potential lender based on the received credit information, the first credit application including at least the first required information fields, and generate a second credit application for the second potential lender based on the received credit information, the second credit application including at least the second required information fields.

13. The system as recited in claim 12, wherein the processor and memory are a credit management server.

14. The system as recited in claim 13, wherein the processor and memory are operated by the credit applicant.

15. A computer readable storage medium comprising computer executable instructions stored thereon which cause a computer system to carry out a method when executed, the method comprising method comprising:

receiving a consumer inquiry regarding financing including an input of the financial transaction type and a selection of potential lenders, the selection of potential lenders including a selection of a first potential lender and a selection of a second potential lender;

accessing a database that is configured to store at least first required information fields and optionally first optional information fields corresponding to the first potential lender and second required information fields and optionally second optional information fields corresponding to the second potential lender;

determining the first required information fields, first optional informational fields, second required information fields and second optional information fields for the input financial transaction type;

generating a dynamic credit application in response to the consumer inquiry, the dynamic credit application including all of the determined first and second required information fields;

receiving credit information from the consumer corresponding to the first information fields and the second information fields;

generating a first credit application for the first potential lender based on the received credit information, the first credit application including at least the first required information fields; and generating a second credit application for the second potential lender based on the received credit information, the second credit application including at least the second required information fields.

* * * * *